United States Patent [19]

Chih et al.

[11] Patent Number: 4,840,242
[45] Date of Patent: Jun. 20, 1989

[54] CONVERTIBLE ANIMAL TOY

[76] Inventors: Liu P. Chih, No. 29, Lane 426, Wor Long Street, Taipei City; Chi Y. Hwang, No. 21, Lane 20, Chung Chen N. Rd., Sun Chong City, Taipei Shien, both of Taiwan

[21] Appl. No.: 163,645

[22] Filed: Mar. 3, 1988

[51] Int. Cl.$^4$ .................... B62D 57/02; A63H 11/20
[52] U.S. Cl. .................................... 180/8.1; 180/7.1; 180/8.6; 180/65.6; 446/460; 446/356
[58] Field of Search ................. 180/7.1, 8.1, 8.6, 65.1, 180/65.6, 237, 203; 446/460, 462, 468, 356; 280/43.24

[56] References Cited

U.S. PATENT DOCUMENTS

| 2,176,551 | 10/1939 | Solem | 280/43.34 |
| 4,680,022 | 7/1987 | Hoshino et al. | 446/356 X |
| 4,735,593 | 4/1988 | Lin | 446/460 X |
| 4,744,781 | 5/1988 | Ostendorff et al. | 446/462 X |

FOREIGN PATENT DOCUMENTS

| 76907 | 6/1919 | Austria | 180/8.6 |
| 2081656 | 2/1982 | United Kingdom | 180/237 |

Primary Examiner—Charles A. Marmor
Assistant Examiner—Brian L. Johnson
Attorney, Agent, or Firm—Notaro & Michalos

[57] ABSTRACT

A walking animal toy is capable of moving forward and backwards as well as turn. The toy is meant for riding by a child. Four legs of the toy can be replaced by four wheels, so that the walking toy can become a car that looks like the animal. The toy includes a battery-powered motor drive and speed reduction which rotates a rear shaft having eccentric projections at its ends. A drive shaft is driven by the rear shaft which, in turn, rotates a front shaft connected to universal joints and similar eccentrical projections. A turning mechanism is connected to the front shaft and a handle is provided for steering the turning mechanism. The head, legs or wheels, and tail of the animal are detachable and can be reassembled by the child.

5 Claims, 7 Drawing Sheets

CONVERTIBLE ANIMAL TOY

BACKGROUND OF THE INVENTION

The present invention relates in general to toys and, in particular, to a new and useful convertible toy.

In the present market, various walking animal toys can be found which, however, are only capable of walking straight forward and are thus quickly considered dull. The condition whereby these toys can only walk in a straight path originates from the fact that walking for an animal requires an accurate timing and a synchronous transmission of its four limbs and thus is more complicated and difficult than the movement of a wheeled toy. The present invention is an improvement on, and diversification of the known walking animal toys.

SUMMARY OF THE INVENTION

According to the present invention, an animal toy is made capable of turning by mounting two universal joints on a front shaft thereof. The toy is convertible by the fact that its four limbs are detachable and can be replaced by four normal wheels so that a car shaped like the animal, is obtained.

It is therefore a main object of the present invention to provide a convertible animal toy which is capable of going forward, backward and turning, and which is convertible from an animal to a car and back again.

This and other objects of the present invention may become apparent through the following description with reference to the accompanying drawings.

DETAILED DESCRIPTION OF THE PREFERRED EMBODIMENT

Figure 1:
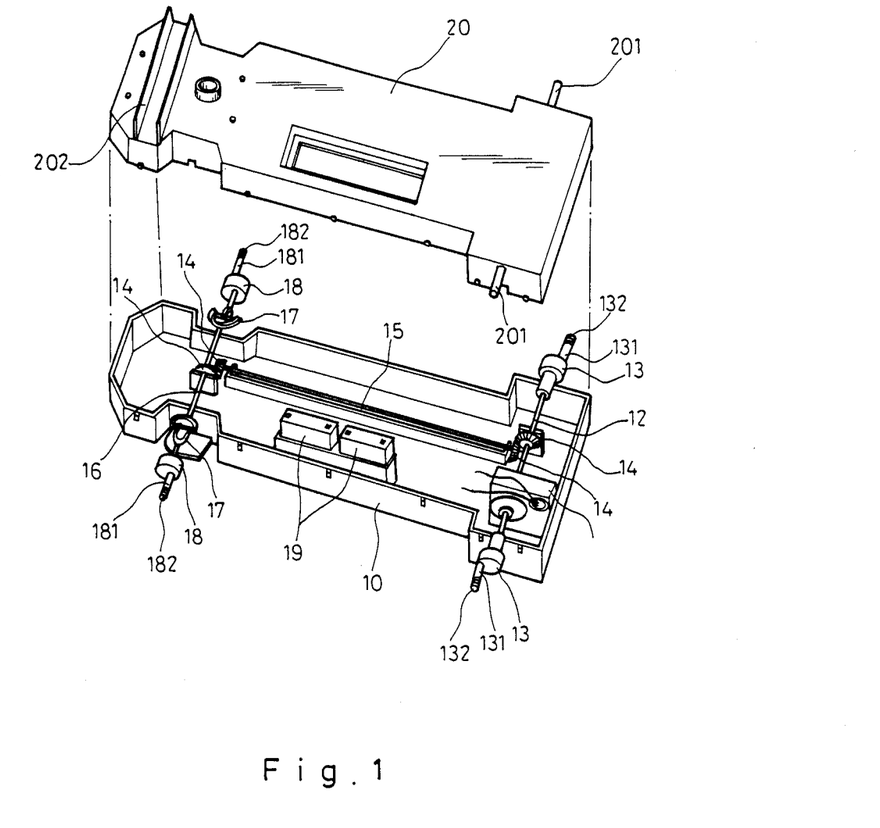
FIG. 1 is an exploded view showing a toy body of a preferred embodiment of a convertible animal toy according to the present invention.

Referring now to FIG. 1, the toy body comprises a lower housing 10 and an upper housing 20. A rear shaft 12 is driven through a reduction gear assembly 11 by one or two small 12 V motors, depending on horsepower, to rotate at about 20 rpm. The motor or motors are in the assembly 11 and thus not visible in FIG. 1. Since the present toy is meant for riding, it requires a large speed reduction. The modulus for the teeth of the gears in the gear assembly 11 must be large in order to avoid the breakage or jumping of a tooth. In order to achieve the desired speed reduction and increase the reduction ratio, the outer diameter of the gear must be increased since its modulus is also large. In order to reduce the volume of the gear and save space in reduction gear assembly 11, it is preferable to use two motors each including three sets of main gears and several smaller gears for simultaneously driving two ultimate gears of larger modulus, the final gear in each motor set having the function of a spring clutch and thus being a safety gear.

Two symmetrical mountings 13 having eccentric projections 131 in phase opposition to each other, are secured to the two ends of rear shaft 12. a bevel gear 14 is mounted at an intermediate position on shaft 12 for driving a geared shaft 15, which includes at the two ends thereof, matching bevel gears 14. Shaft 15, in turn, drives a front shaft 16, which includes at the two ends thereof, mountings 18, having eccentric projections 181 in phase opposition to each other. Two universal mounts or joints 17 are connected respectively inside the mountings 18 and to the front shaft 16. Each projection 181 is in phase opposition to the projection 131 located at the same side of the lower housing 10. Thus, on each side of housing 10, projection 131 is rotated 180° out of phase with projection 181.

Figure 2:
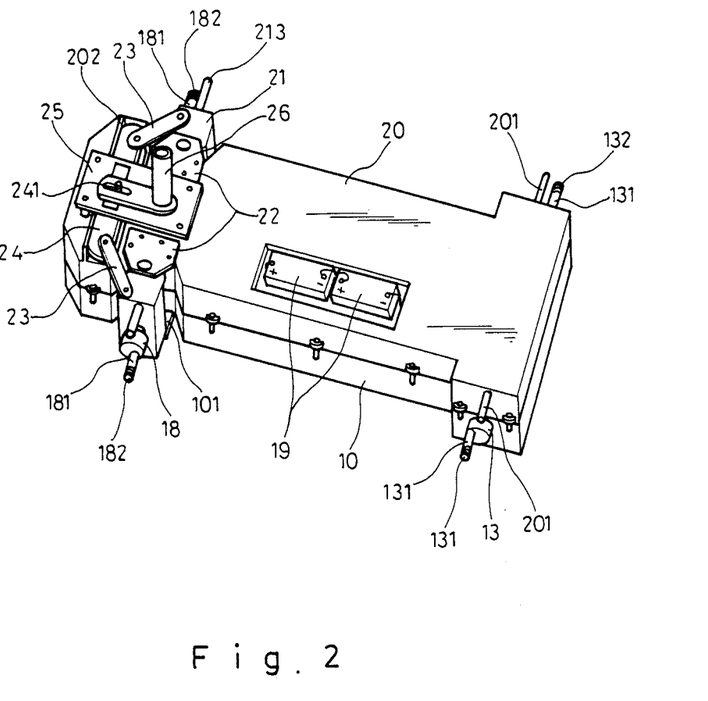
FIG. 2 is an assembled view showing a toy body of a convertible animal toy according to the present invention.
Figure 3:
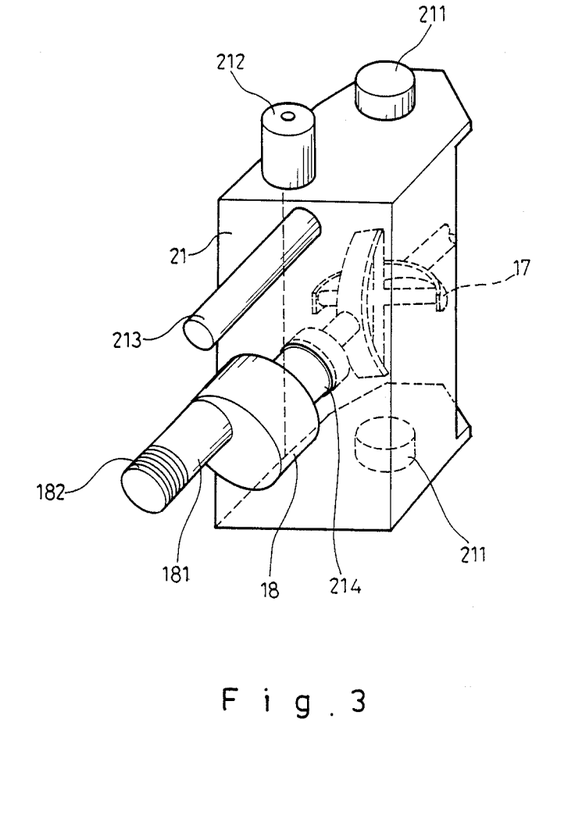
FIG. 3 is a perspective view showing a turning support of the convertible animal toy.

As shown in FIG. 2 and 3, the assembled toy body includes the lower housing 10 and the upper housing 20, which are connected to each other. A turning mechanism is connected to the front of the toy body which includes turning supports 21, which are each in the form of a case that is open toward the interior of the toy body and is provided at the top surface thereof with a pivot 211 and a shaft 212, and at the bottom surface thereof with a corresponding pivot 211. An outer surface or wall of each case 21, has a hole 214 and a rod projection 213.

A sliding piece 24 is slidably guided in a groove 202 of the upper housing 20. Two connecting pieces 23 respectively connect supports 21 to sliding piece 24. A securing plate 25 holds sliding piece 24 in its groove and a turning handle 26 is engaged with a projection 241 of sliding piece 24. Pivots 211 of support 21 are respectively rotatably received in an upper fixing plate 22 and a lower fixing plate 101.

Each end of front shaft 16, which carries mounting 18, passes through one of the holes 214 and connects to one of the universal joints 17. Thus, when the projection 241 of sliding piece 24 is moved transversely with respect to the toy body, by turning handle 26, connecting pieces 23 and turning supports 21 will pivot, thus steering mountings 18. Mountings 18 can still rotate, however, through the universal joints 17. Since the open sides of supports 21 face inwardly and at least partly enclose the universal joints 17, the joints will not harm the rider and thus are safe for use. The present toy can use 12V which is supplied by two batteries 19 connected in series and located in an intermediate portion of the toy body.

Figure 4:
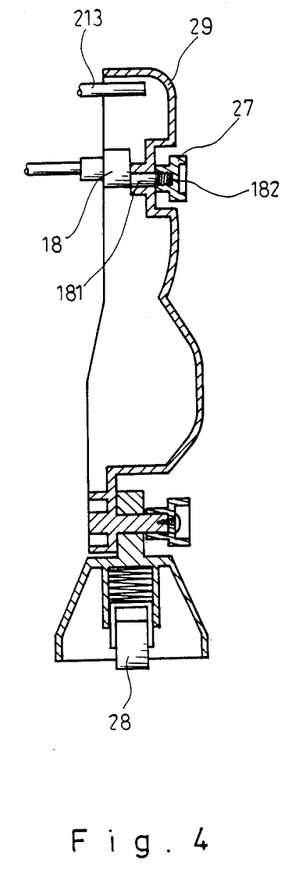
FIG. 4 is a sectional view showing a leg-like piece of the convertible animal toy.
Figure 5:
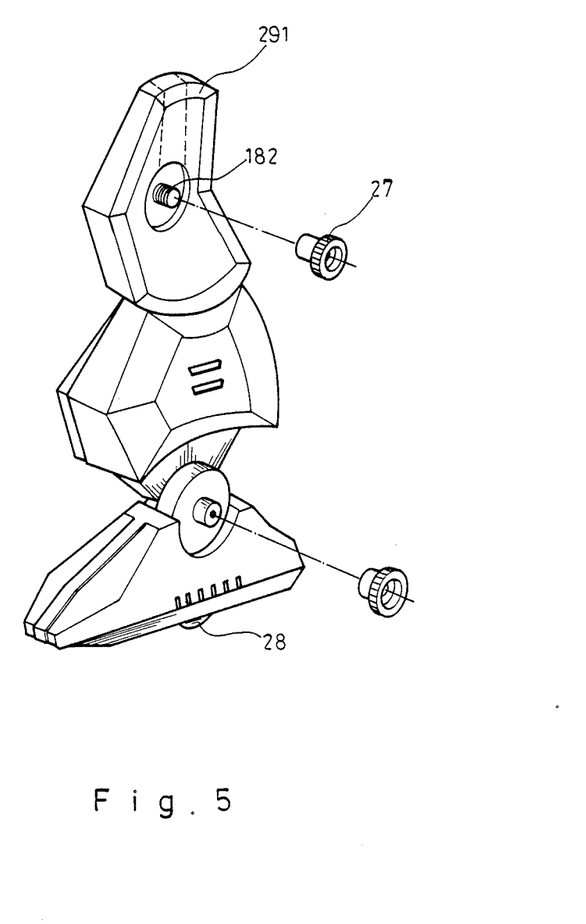
FIG. 5 is a perspective view showing a leg-like piece according to the convertible animal toy.

As shown in FIGS. 4 and 5, each projection 181 (131) is inserted into an upper central hole of a leg-like piece 29 having a guiding groove 291 for receiving and guiding the rod projection 213 of an adjacent support 21. Each projection 181 has a threaded end 182 and a nut 27, so that leg-like piece 29 will thus execute a walking action in an elliptic manner as eccentric projection 181 rotates. In order to be capable of being easily moved upon being unloaded and to avoid damage to the legs, the bottom of each of the legs 28 is provided with a spring and a wheel 28 which is totally received in a bottom recess of the leg when the toy body is loaded with a weight that is heavier than 10 kg. When the toy body is unloaded or loaded by a weight lighter than 10 kg., the animal toy can no longer walk and can only be moved by the rotation of wheels 28. Through this provision, the toy can easily be moved upon being underloaded and a child having a weight no more than 10 kg. cannot cause it to walk. This is to prevent him from falling or being in danger.

Figure 6:
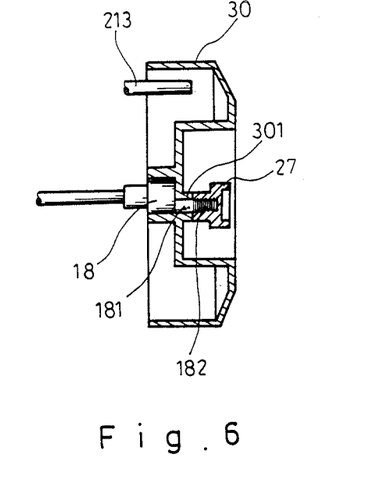
FIG. 6 is a sectional view showing a wheel to be used in the convertible animal toy.
Figure 7:
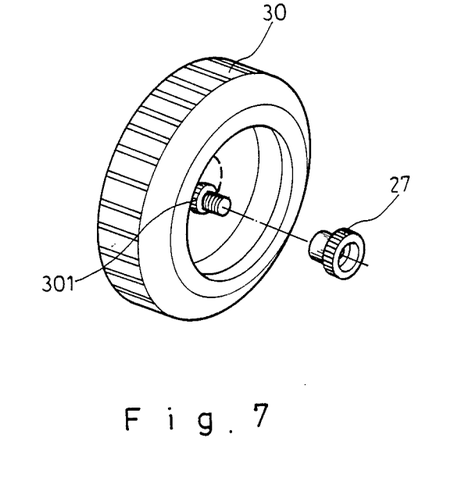
FIG. 7 is a perspective view showing the wheel of FIG. 6.

As shown in FIGS. 6 and 7, a wheel 30 having a recess 301, which matches the projection 181 and is coaxially mounted on mounting 18, is provided and rotates in circular motion when mounting 18 rotates. In order to prevent rod projection 213 from obstructing this rotation of wheel 30, a portion of wheel 30 is hollowed to freely receive rod projection 213 and allow free rotation of wheel 30.

The structure shown can inherently walk with legs 29 or roll on wheels 30, forwardly or rearwardly, simply by reversing the rotation of the motors.

Figure 8:
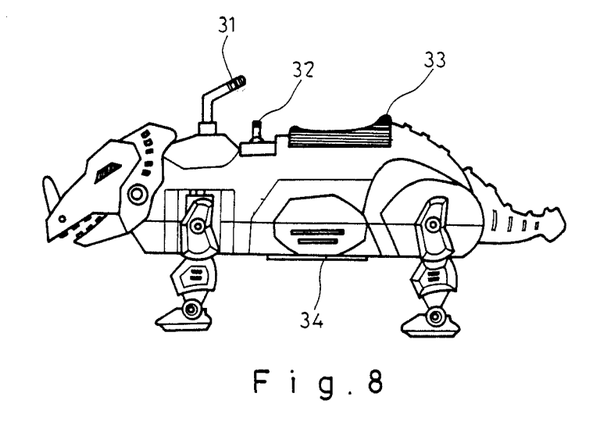
FIG. 8 is a side view showing the convertible animal toy in its first configuration.
Figure 9:
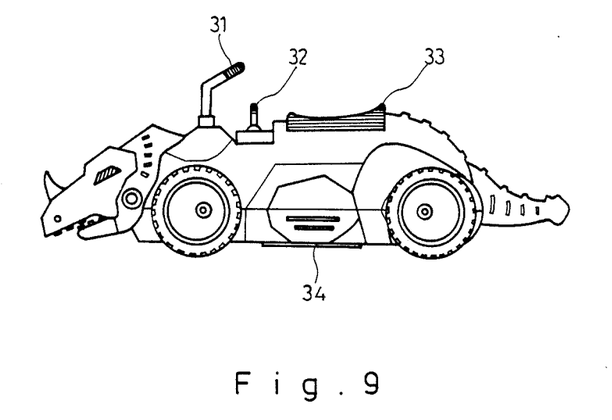
FIG. 9 is a side view showing the convertible animal toy in its second configuration.

As shown in FIGS. 8 and 9, the toy of the invention is provided with a saddle 33, a control switch 32, a direction handle 31 for steering turning handle 26, and two pedals 34. The toy is capable of going forward, backward and turning, and of being converted to an animal or car.

The head and tail can also be detached from the body.

What we claim is:

1. A convertible animal toy, comprising:
   a toy body;
   a front shaft having opposite ends and a rear shaft having opposite ends, said front and rear shafts being spaced from each other and mounted for rotation to said toy body;
   a universal joint connected to each end of said front shaft and on opposite sides of said toy body;
   a first pair of eccentric projections connected respectively to said universal joints, said first pair of eccentric projections being in phase opposition to each other;
   a second pair of eccentric projections connected respectively to said opposite ends of said rear shaft on opposite sides of said toy body, said second pair of eccentric projections being in phase opposition to each other, eccentric projections from said first and second pair of eccentric projections on each side of said toy body being in phase opposition to each other;
   reduction gear drive means mounted to said toy body and operatively connected to said rear shaft for rotating said rear shaft;
   a bevel gear connected to each of said front and rear shafts;
   a bevel gear shaft having bevel gears engaged with said bevel gears of said front and rear shafts for transferring rotation of said rear shaft to said front shaft over said bevel gear shaft;
   a moving medium connected to each of said eccentric projections for movement by rotation of said front and rear shafts to move said toy body;
   a turning support mounted for pivotal movement to each side of said toy body adjacent said front shaft, each of said first pair of eccentric projections being engaged for rotation in one of said turning supports for steering of said first pair of eccentric projections with pivoting of said turning supports;
   a sliding piece mounted for sliding movement to said toy body adjacent said front shaft;
   a connecting piece connected between each turning support and said sliding piece for pivoting each turning support with sliding of said slide piece to steer said first pair of eccentric projections; and
   a turning medium operatively engaged with said sliding piece for sliding said sliding piece to steer said first pair of eccentric projections.

2. A convertible animal toy according to claim 1, wherein said moving medium each comprises a leg-like piece engaged with one of said eccentric projections for executing walking movement with rotation of said eccentric projection.

3. A convertible animal toy according to claim 1, wherein said moving medium each comprises a wheel connected to one of said eccentric projections for rotation with rotation of said eccentric projection.

4. A convertible animal toy according to claim 2, including a recess at a lower end of each of said leg-like pieces, a spring in each recess and a wheel engaged by each spring and mounted for rotation in said recess of said leg-like piece for retraction of said wheel against said spring to be totally received in said recess when weight larger than a selected amount is placed on said toy body.

5. A convertible animal toy, comprising:
   a toy body;
   a front shaft having opposite ends and a rear shaft having opposite ends, said front and rear shafts being spaced from each other and mounted for rotation to said toy body;
   a universal joint connected to each end of said front shaft and on opposite sides of said toy body;
   a first pair of eccentric projections connected respectively to said universal joints, said first pair of eccentric projections being in phase opposition to each other;
   a second pair of eccentric projections connected respectively to said opposite ends of said rear shaft on opposite sides of said toy body, said second pair of eccentric projections being in phase opposition to each other, eccentric projections from said first and second pair of eccentric projections on each side of said toy body being in phase opposition to each other;
   reduction gear drive means mounted to said toy body and operatively connected to said rear shaft for rotating said rear shaft;
   a bevel gear connected to each of said front and rear shafts;
   a bevel gear shaft having bevel gears engaged with said bevel gears of said front and rear shafts for transferring rotation of said rear shaft to said front shaft over said bevel gear shaft;
   a set of moving media for connection to each of said eccentric projections for movement by rotation of said front and rear shafts to move said toy body, said sets including one set of four leg-like pieces each for engagement with one of said eccentric projections for executing walking movement with rotation of said eccentric projection, and a second set of four wheels each for connection to one of said eccentric projections for rotation, with rotation of said eccentric rotations; a turning support mounted for pivotal movement to each side of said toy body adjacent said front shaft, each of said first pair of eccentric projections being engaged for rotation in one of said turning supports for steering of said first pair of eccentric projections with pivoting of said turning supports sliding means mounted for sliding movement to said toy body; and connecting means connected between said sliding means and each turning support for pivoting each turning support.

* * * * *